(12) United States Patent
Kaneko

(10) Patent No.: US 11,493,117 B2
(45) Date of Patent: Nov. 8, 2022

(54) BALL SCREW DEVICE

(71) Applicant: JTEKT CORPORATION, Osaka (JP)

(72) Inventor: Tetsuya Kaneko, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 306 days.

(21) Appl. No.: 16/838,150

(22) Filed: Apr. 2, 2020

(65) Prior Publication Data

US 2020/0340561 A1  Oct. 29, 2020

(30) Foreign Application Priority Data

Apr. 23, 2019  (JP) .............................. JP2019-082058

(51) Int. Cl.
*F16H 25/22* (2006.01)
*F16H 25/20* (2006.01)
*B62D 5/04* (2006.01)

(52) U.S. Cl.
CPC ....... *F16H 25/2214* (2013.01); *B62D 5/0421* (2013.01); *B62D 5/0448* (2013.01); *F16H 2025/2081* (2013.01); *F16H 2025/2096* (2013.01)

(58) Field of Classification Search
CPC ............................ B62D 5/0421; B62D 5/0448
See application file for complete search history.

(56) References Cited

U.S. PATENT DOCUMENTS

| | | | |
|---|---|---|---|
| 8,863,598 B2 * | 10/2014 | Asakura ............... | B62D 5/0448 74/424.82 |
| 2010/0139433 A1 * | 6/2010 | Chen .................. | F16H 25/2214 74/424.87 |
| 2012/0000306 A1 * | 1/2012 | Chen .................. | F16H 25/2214 74/424.86 |
| 2015/0151780 A1 * | 6/2015 | Fujita .................. | F16H 25/2219 74/89.23 |

FOREIGN PATENT DOCUMENTS

| | | |
|---|---|---|
| DE | 102014110765 A1 | 6/2015 |
| EP | 1193422 A1 | 4/2002 |
| JP | 2003-113921 A | 4/2003 |
| JP | 2007321886 A * | 12/2007 |
| JP | 2013-155845 A | 8/2013 |

OTHER PUBLICATIONS

Sep. 29, 2020 Search Report issued in European Patent Application No. 20170834.4.

* cited by examiner

*Primary Examiner* — Jacob D Knutson
(74) *Attorney, Agent, or Firm* — Oliff PLC

(57) ABSTRACT

A ball screw device includes a screw shaft having a first screw groove formed on an outer circumference thereof, a ball screw nut having a second screw groove formed on an inner circumference thereof, and a plurality of balls disposed in a spiral ball raceway wherein the first screw groove and the second screw groove face each other. A circulation member is attached to an attachment hole radially penetrating the ball screw nut and a circulation path is formed, the (Continued)

circulation path allowing endless circulation of each of the balls rolling in the ball raceway by short-circuiting between two points of the ball raceway.

2 Claims, 6 Drawing Sheets

BALL SCREW DEVICE

CROSS REFERENCE TO RELATED APPLICATIONS

This application claims priority from Japanese Patent Application No. 2019-082058 filed on Apr. 23, 2019, the entire contents of which are incorporated herein by reference.

BACKGROUND OF THE INVENTION

Field of the Invention

The present invention relates to a ball screw device.

Description of Related Art

According to related art, there is an electric power steering device (EPS) in which a rotation member through which a steered shaft is inserted and that is rotated by motor driving is provided, and by converting rotation of the rotation member into axial movement of the steered shaft by a ball screw device, an assist force for assisting steering of a driver is applied to a steering mechanism. As the ball screw device used in such an EPS, for example, Patent Literature 1 discloses a ball screw device in which a ball screw nut that rotates integrally with a pulley as a rotation member is provided, and a plurality of balls are disposed in a spiral ball raceway formed by allowing a screw groove formed on an inner circumference of the ball screw nut and a screw groove formed on an outer circumference of a steered shaft to face each other.

In general, the ball screw device has a circulation path that short-circuits between two points set in the ball raceway. When the balls rolling in the ball raceway passes through the circulation path, the ball moves from a downstream side to an upstream side and are endlessly circulated between the two points. In the ball screw device described in Patent Literature 1, the circulation path is configured by attaching a circulation member, a so-called deflector, having a function of scooping balls from the ball raceway and a function of discharging balls to the ball raceway, to an attachment hole penetrating the ball screw nut in the radial direction.

[Patent Literature 1] JP-A-2013-155845

According to a related art, a circulation member is inserted into an attachment hole of a ball screw nut, and when a position of the circulation member in the attachment hole is shifted, action of the balls passing through the circulation path may be affected and smooth circulation thereof may be hindered.

SUMMARY

One or more embodiments provide a ball screw device capable of realizing smooth circulation of balls.

In an aspect (1), one or more embodiments provide a ball screw device provided with a screw shaft having a first screw groove formed on an outer circumference thereof, a ball screw nut having a second screw groove formed on an inner circumference thereof, and a plurality of balls disposed in a spiral ball raceway wherein the first screw groove and the second screw groove face each other. A circulation member is attached to an attachment hole radially penetrating the ball screw nut and a circulation path is formed, the circulation path allowing endless circulation of each of the balls rolling in the ball raceway by short-circuiting between two points of the ball raceway. A facing surface of the circulation member that faces an inner peripheral surface of the attachment hole includes a pressing area having a protruding portion pressing the inner peripheral surface, and a non-pressing area at which the circulation member is gap-fitted into the attachment hole. The non-pressing area is located in at least an area of the facing surface on an inner circumferential side of the ball screw nut with respect to the pressing area.

According to the aspect (1), the protruding portion is in pressure-contact with the inner peripheral surface of the attachment hole, so that displacement of the circulation member in the attachment hole can be prevented. Accordingly, circular circulation of the balls can be realized. Since the facing surface of the circulation member includes the non-pressing area at which the circulation member is gap-fitted into the attachment hole and the non-pressing area exists on the inner circumferential side of the ball screw nut with respect to the pressing area, when being attached in the attachment hole from a radially outer side, the circulation member can be inserted into the attachment hole without resistance until the pressing area reach the attachment hole. Accordingly, even if the protruding portion is provided on the facing surface, assemblability of the circulation member into the attachment hole can be prevented from decreasing.

In an aspect (2), the protruding portion may be formed in the circulation member on at least one of both sides in an axial direction and both sides in a circumferential direction of the ball screw nut.

According to the aspect (2), a position of the circulation member in the attachment hole can be suitably prevented from shifting in at least one of the axial direction and the circumferential direction of the ball screw nut.

In an aspect (3), a contact surface of the protruding portion located on the inner circumferential side of the ball screw nut may be formed in a curved shape matching an outer circumferential surface of the ball screw nut as viewed in the axial direction of the ball screw nut.

According to the aspect (3), since the protruding portion is form so as to be in pressure-contact with the facing surface, when the circulation member is attached to the attachment hole from the radially outer side, the contact surface of the protruding portion located on the inner circumferential side of the ball screw nut is in contact with a peripheral edge portion of the attachment hole in the outer circumferential surface of the ball screw nut. Since the contact surface is formed in a curved shape matching the outer circumferential surface of the ball screw nut, the contact surface is in surface-contact with the peripheral edge portion of the attachment hole. Therefore, a posture of the circulation member immediately before the protruding portion is in pressure-contact with the inner peripheral surface of the attachment hole can be stabilized, thereby improving the assemblability.

According to one or more embodiments, the smooth circulation of the balls can be realized.

DETAILED DESCRIPTION

Hereinafter, an embodiment in which a ball screw device is applied to an electric power steering device (EPS) will be described with reference to the drawings.

Figure 1:
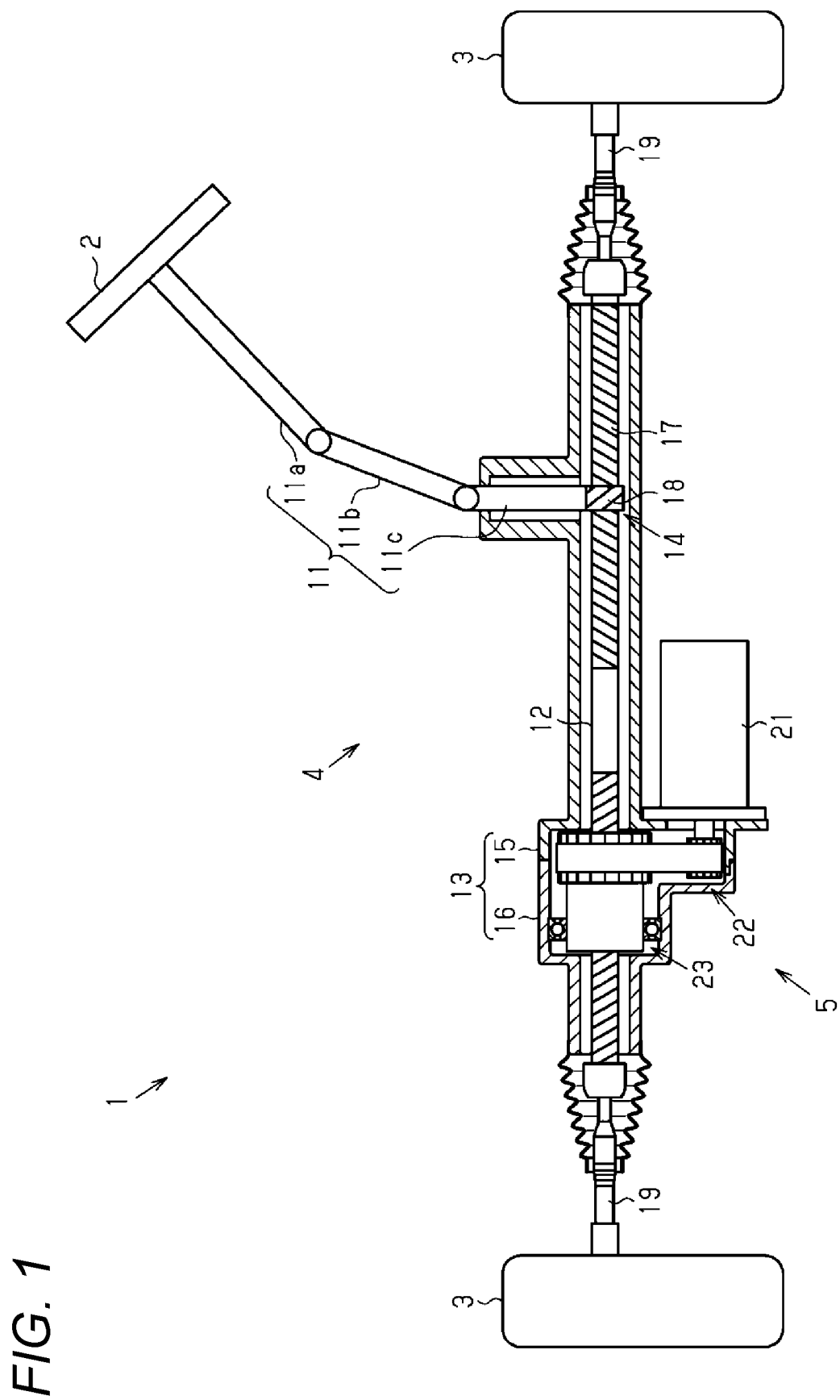
FIG. 1 is a schematic configuration view of an electric power steering device.

As shown in FIG. 1, the EPS 1 includes a steering mechanism 4 that steers steered wheels 3 based on operation of a steering wheel 2 by a driver, and an EPS actuator 5 that applies an assist force for assisting the steering operation to the steering mechanism 4.

The steering mechanism 4 includes a steering shaft 11 to which the steering wheel 2 is fixed, a rack shaft 12 as a steered shaft coupled to the steering shaft 11, a rack housing 13 through which the rack shaft 12 is inserted so as to be able to reciprocate, and a rack and pinion mechanism 14 that converts rotation of the steering shaft 11 into reciprocation of the rack shaft 12. The steering shaft 11 is configured by coupling a column shaft 11a, an intermediate shaft 11b and a pinion shaft 11c in order from a side where the steering wheel 2 is located.

The rack housing 13 is formed by coupling a first housing 15 and a second housing 16 each having a cylindrical shape. The rack shaft 12 and the pinion shaft 11c are disposed in the first housing 15 at a predetermined intersection angle. The rack and pinion mechanism 14 is configured by meshing rack teeth 17 formed on the rack shaft 12 with pinion teeth 18 formed on the pinion shaft 11c. A tie rod 19 is coupled to each of both ends of the rack shaft 12, and a tip end of the tie rod 19 is connected to a knuckle (not shown) to which the steered wheel 3 is assembled. Therefore, in EPS 1, the rotation of the steering shaft 11 accompanying the steering operation is converted into axial movement of the rack shaft 12 by the rack and pinion mechanism 14, and this axial movement is transmitted to the knuckle via the tie rod 19, whereby a steered angle of the steered wheel 3, that is, a traveling direction of a vehicle is changed.

The EPS actuator 5 includes a motor 21 serving as a drive source, a belt mechanism 22 that transmits rotation of the motor 21, and a ball screw device 23 that converts the rotation transmitted via the belt mechanism 22 into reciprocation of the rack shaft 12, and is provided at a coupling portion between the first housing 15 and the second housing 16. The EPS actuator 5 transmits the rotation of the motor 21 to the ball screw device 23 via the belt mechanism 22, and converts the rotation into the reciprocation of the rack shaft 12 by the ball screw device 23, thereby applying the assist force to the steering mechanism 4.

Next, a configuration of the EPS actuator 5 will be described in detail. Hereinafter, for convenience of description, a side of the rack shaft 12 opposite to the rack and pinion mechanism 14, that is, a left side in FIG. 2A is defined as an axially one end side, and a right side in FIG. 2A is defined as an axially the other end side.

Figure 2A:
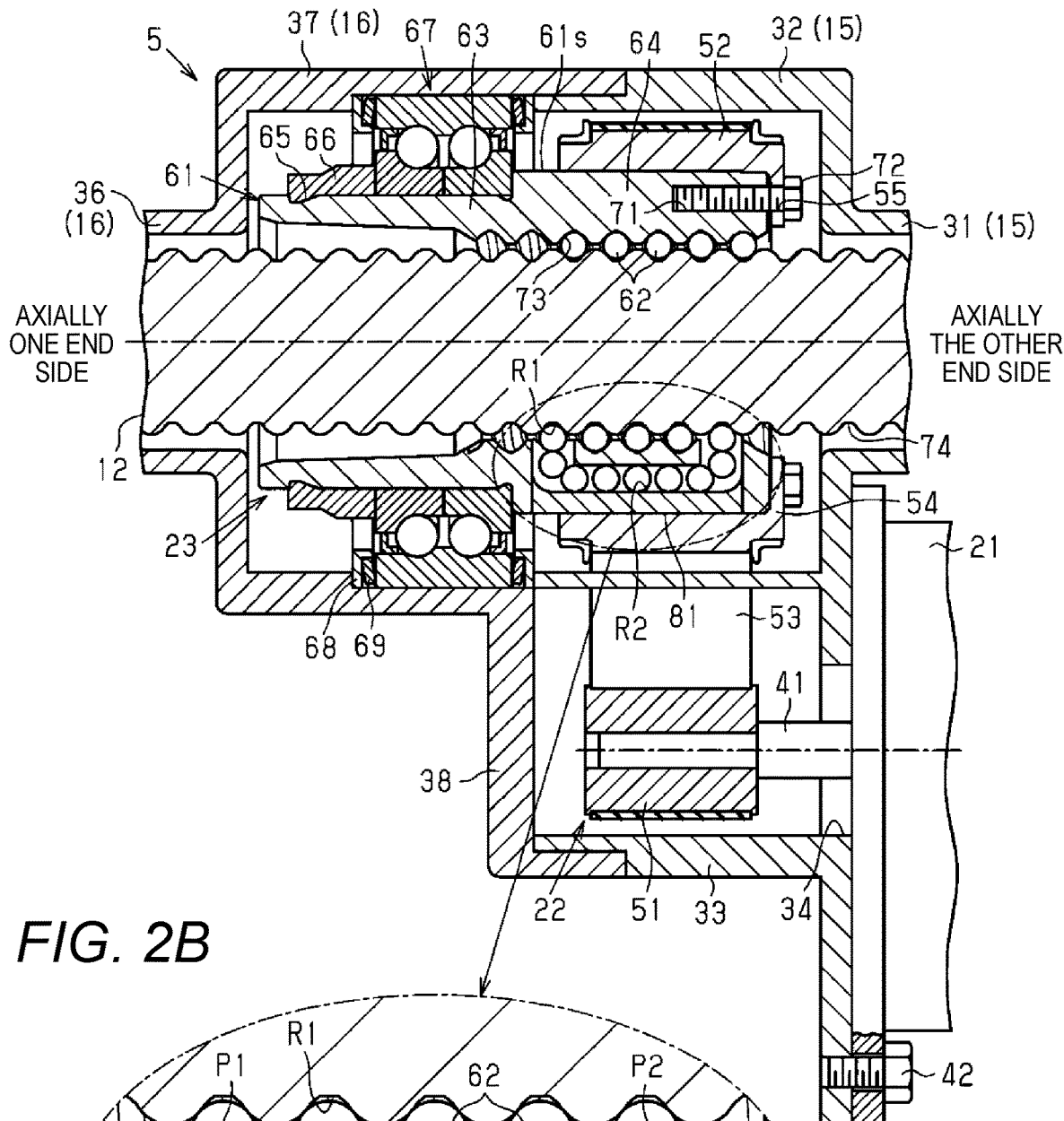
FIG. 2A is a cross-sectional view of a ball screw nut in vicinity of an actuator along an axial direction.

As shown in FIG. 2A, the first housing 15 includes a first cylindrical portion 31 and a first accommodation portion 32 formed on the axially one end side of the first cylindrical portion 31. The first accommodation portion 32 is formed in a cylindrical shape having a diameter larger than that of the first cylindrical portion 31. A bulging portion 33 having a shape in which a part of a circumferential wall of the first accommodation portion 32 is bulged toward a side where the motor 21 is disposed is formed in the first accommodation portion 32. An insertion hole 34 penetrating in an axial direction of the rack shaft 12 is formed in an end wall of the bulging portion 33.

The second housing 16 includes a second cylindrical portion 36 and a second accommodation portion 37 formed on the axially the other end side of the second cylindrical portion 36. The second accommodation portion 37 is formed in a cylindrical shape having a diameter larger than that of the second cylindrical portion 36. A cover portion 38 that covers the bulging portion 33 of the first housing 15 is formed in the second accommodation portion 37.

A rotation shaft 41 of the motor 21 is inserted into the bulging portion 33 through the insertion hole 34. The motor 21 is attached to the first housing 15 via a bolt 42 with the rotation shaft 41 parallel to the rack shaft 12.

The belt mechanism 22 includes a drive pulley 51, a driven pulley 52 as a rotation member, and a belt 53. The drive pulley 51 is formed in a cylindrical shape, and is coaxially coupled to the rotation shaft 41 of the motor 21 so as to be integrally rotatable. The driven pulley 52 is formed in a cylindrical shape, and is rotatably disposed on an outer circumference of the rack shaft 12 at an axial position the same as that of the drive pulley 51. A flange portion 54 extending radially inward is formed on the axially the other end side of the driven pulley 52. A plurality of insertion holes 55 penetrating in the axial direction are formed in the flange portion 54. The belt 53 is formed of an elastic material such as rubber, and is wound around the driven pulley 51 and the driven pulley 52 so as to generate a predetermined tension there between.

The ball screw device 23 includes the rack shaft 12 serving as a screw shaft, a ball screw nut 61 coaxially disposed on the outer circumference of the rack shaft 12, and a plurality of balls 62 provided between the rack shaft 12 and the ball screw nut 61.

The ball screw nut 61 is formed in a stepped cylindrical shape having different outer diameters, and includes a small-diameter cylindrical portion 63 and a large-diameter cylindrical portion 64 provided on the axially the other end side of the small-diameter cylindrical portion 63. The outer diameter of the small-diameter cylindrical portion 63 is set to be smaller than the outer diameter of the large-diameter cylindrical portion 64. An annular fixing groove 65 extending over an entire circumference of the small-diameter cylindrical portion 63 is formed at a position near an axially one end on the outer circumference. An annular retainer 66 is fixed to the outer circumference of the small-diameter cylindrical portion 63 by caulking so as to be in close contact with the fixing groove 65, and a rolling bearing 67 is fixed in a state of being pressed against a stepped surface between the small-diameter cylindrical portion 63 and the large-diameter cylindrical portion 64 by the retainer 66. Accordingly, the ball screw nut 61 is rotatably supported in the first accommodation portion 32 and the second accommodation portion 37.

A double-row angular contact ball bearing is employed as the rolling bearing 67, and a preload is applied by the retainer 66 such that an internal gap thereof becomes a preset gap. On both sides of the rolling bearing 67, retainers 68 each having an L-shaped cross section are disposed adjacent to an outer ring of the rolling bearing 67, and an elastic body 69 such as rubber is disposed between the first housing 15 and the second housing 16 in a compressed state in the retainer 68.

The outer diameter of the large-diameter cylindrical portion 64 is set to be substantially equal to an inner diameter of the driven pulley 52. A plurality of bolt holes 71 are formed on an axially the other end surface of the large-diameter cylindrical portion 64. The driven pulley 52 is fitted to an outer circumference of the large-diameter cylindrical portion 64. The ball screw nut 61 is coupled to the driven pulley 52 so as to be integrally rotatable by screwing a bolt 72 into the bolt hole 71 via the insertion hole 55.

A screw groove 73 is formed on an inner circumference of the ball screw nut 61. On the other hand, a screw groove 74 corresponding to the screw groove 73 is formed on the outer circumference of the rack shaft 12. A spiral ball raceway R1 is formed by screw grooves 73, 74 facing each other. A plurality of balls 62 are disposed in the ball raceway R1 in a state of being sandwiched between the screw grooves 73, 74. That is, the ball screw nut 61 is screwed to the outer circumference of the rack shaft 12 via the balls 62. Accordingly, the balls 62 roll within the ball raceway R1 while receiving a load due to relative rotation between the rack shaft 12 and the ball screw nut 61. When relative positions of the rack shaft 12 and the ball screw nut 61 in the axial direction are displaced by rolling of the balls 62, a torque of the motor 21 is applied to the rack shaft 12 as the assist force.

Figure 2B:
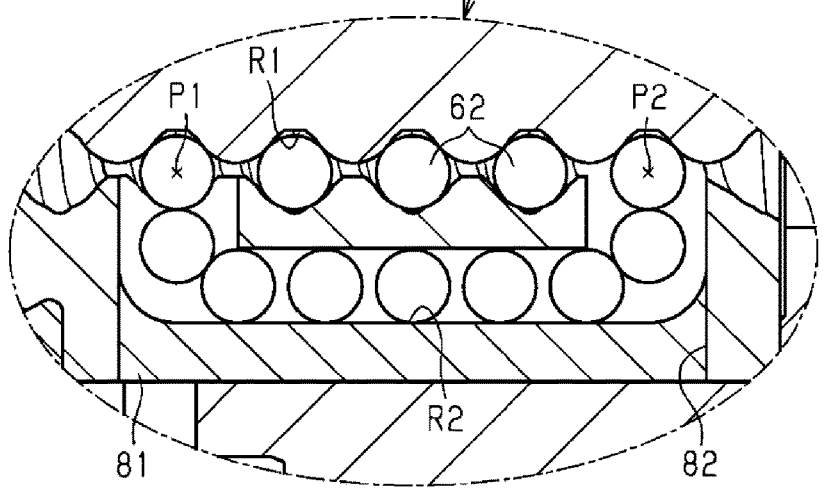
FIG. 2B is an enlarged cross-sectional view of vicinity of a circulation member.

As shown in FIG. 2B, a circulation path R2 open at connection points P1, P2 set at two positions in the screw groove 73 is formed in the ball screw nut 61. The ball raceway R1 is short-circuited by the circulation path R2 between the two connection points P1, P2 corresponding to the opening positions. Therefore, the balls 62 reaching the connection point P1 or the connection point P2 by rolling in the ball raceway R1 pass through the circulation path R2, thereby being discharged to the connection point P2 or the connection point P1, and are endlessly circulated by moving in the ball raceway R1 from a downstream side to an upstream side. In the circulation path R2, each ball 62 moves in the circulation path by being pushed by the adjacent ball 62 rearward in the circulation direction when the ball 62 newly enters the circulation path R2 from the ball raceway R1.

Here, in the ball screw device 23, the circulation path R2 is configured by attaching a circulation member 81 from a radially outer side. The circulation member 81 has a function of scooping the ball 62 from the ball raceway R1 into an attachment hole 82 radially penetrating the ball screw nut 61 and a function of discharging the ball 62 to the ball raceway R1.

Figure 3:
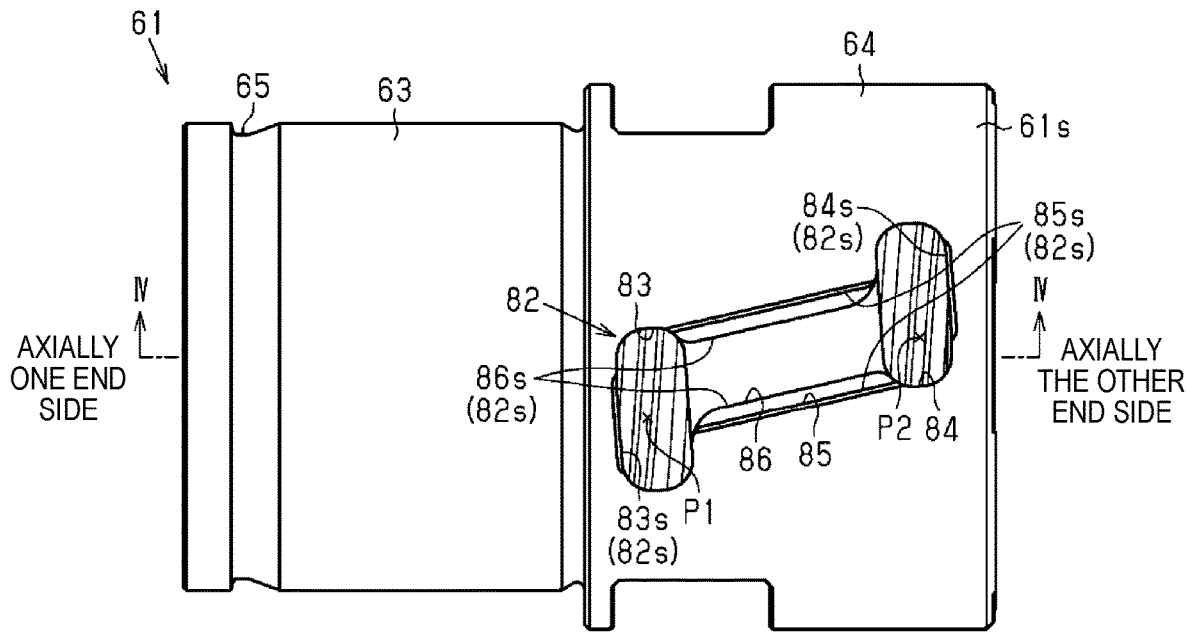
FIG. 3 is a plan view of the ball screw nut.
Figure 4:
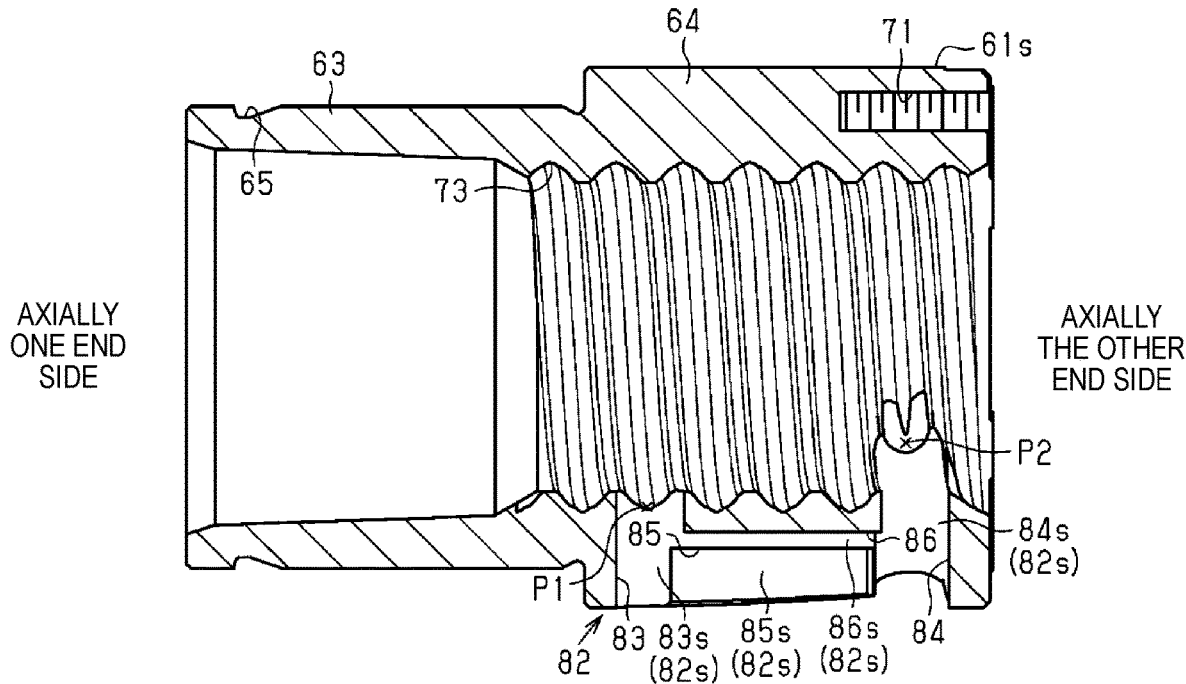
FIG. 4 is a cross-sectional view of the ball screw nut along the axial direction, and is a cross-sectional view taken along line IV-IV in FIG. 3.
Figure 5:
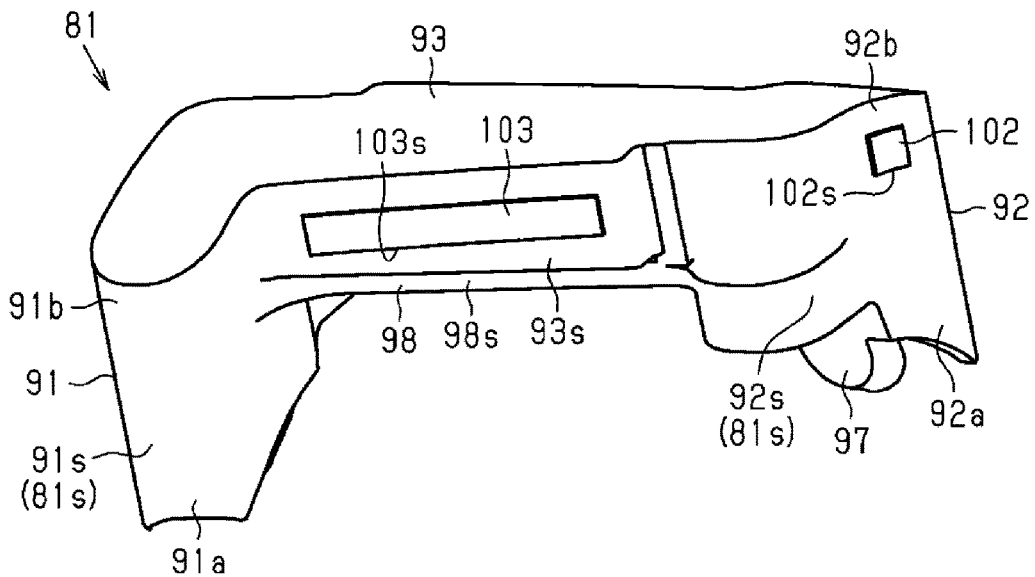
FIG. 5 is a perspective view of the circulation member.

More specifically, as shown in FIGS. 3 and 4, the attachment hole 82 by which the circulation member 81 is mounted is formed in the large-diameter cylindrical portion 64 of the ball screw nut 61. The attachment hole 82 has through hole portions 83, 84 formed at positions corresponding to the two connection points P1, P2, and a connection recess portion 85 connecting the through hole portions 83, 84. The attachment hole 82 is formed so as to be point-symmetrical with respect to a center of the attachment hole 82 as viewed in a radial direction of the ball screw nut 61.

The through hole portions 83, 84 are each formed in an oval shape penetrating inside and outside of the ball screw nut 61. The connection points P1, P2 are set at positions in the axial direction of the ball screw nut 61 that sandwiches the screw groove 73 for several turns therebetween, and a flow path of one system is formed by the ball raceway R1 and the circulation path R2. The connection points P1, P2 are set at positions shifted from each other in a circumferential direction of the ball screw nut 61, and the through hole portions 83, 84 are formed at positions shifted from each other in the circumferential direction of the ball screw nut 61.

The connection recess portion 85 is formed in a linear groove shape that connects a circumferentially one end portion of the ball screw nut 61 in the through hole portion 83 and a circumferentially the other end portion of the ball screw nut 61 in the through hole portion 84. The connection recess portion 85 has a deep groove portion 86 formed deeper than both side portions in a circumferentially central portion of the ball screw nut 61. That is, the connection recess portion 85 is formed in a stepped groove shape whose central portion is deeper along the circumferential direction of the ball screw nut 61. On the other hand, the connection recess portion 85 is formed so as to have a substantially constant depth over the entire area in an extending direction. The extending direction of the connection recess portion 85 is inclined with respect to the axial direction of the ball screw nut 61.

As shown in FIGS. 5 to 10, the circulation member 81 includes a pair of columnar portions 91, 92 respectively inserted into the through hole portions 83, 84, and a coupling portion 93 coupling the columnar portions 91, 92. The circulation member 81 is formed so as to be point-symmetrical with respect to a center thereof as viewed in the radial direction of the ball screw nut 61.

Figure 6:
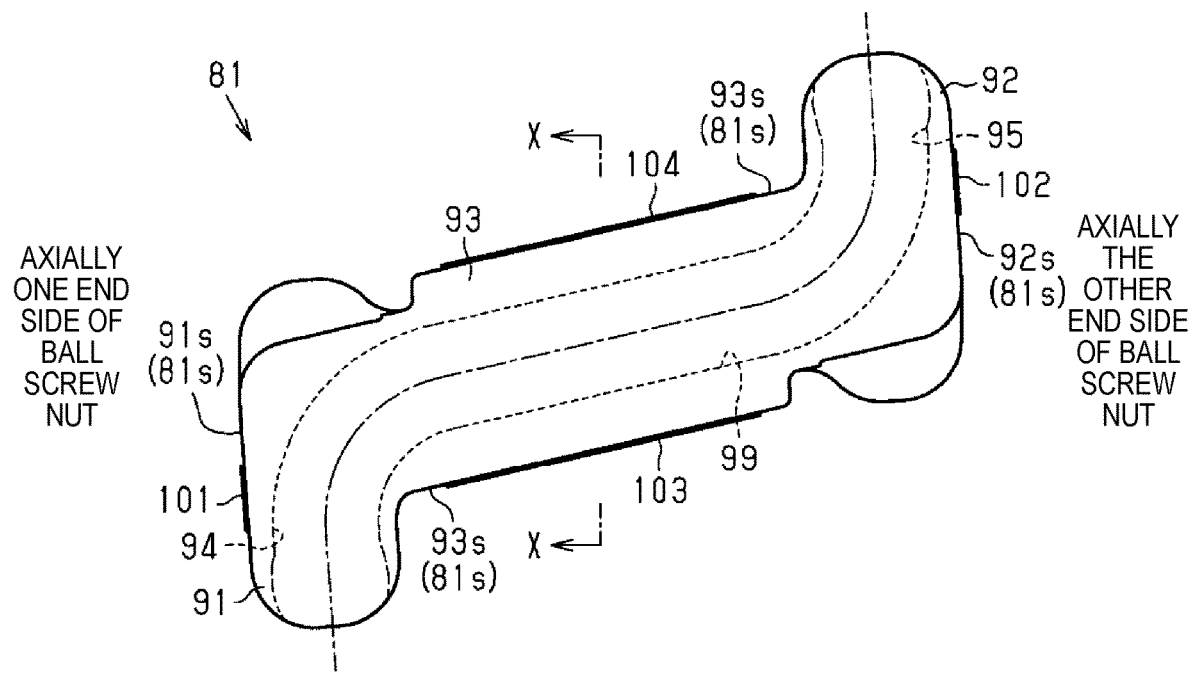
FIG. 6 is a plan view of the circulation member as viewed from a radially outer side of the ball screw nut.
Figure 7:
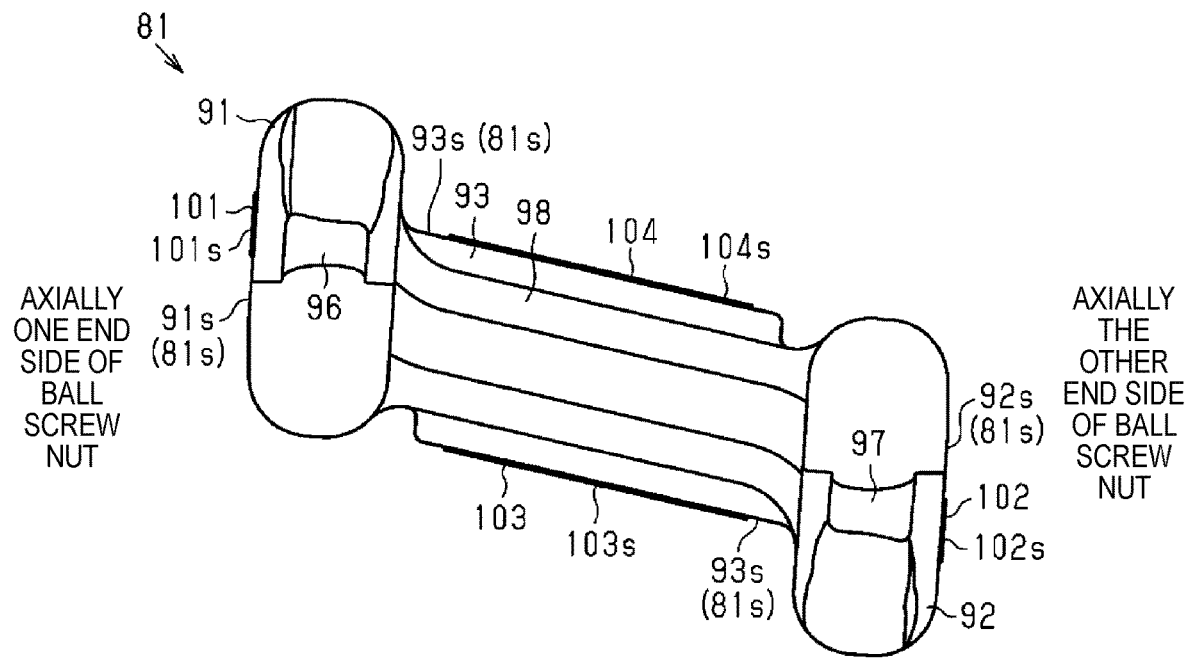
FIG. 7 is a bottom view of the circulation member as viewed from a radially inner side of the ball screw nut.
Figure 8:
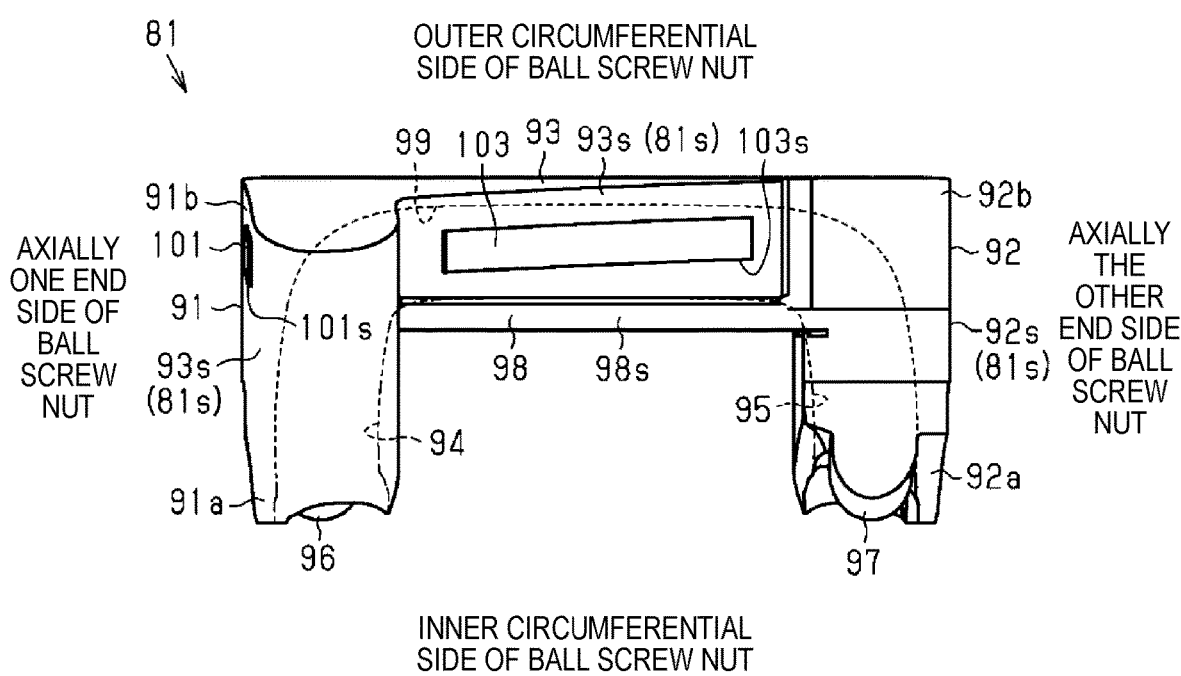
FIG. 8 is a side view of the circulation member as viewed from a circumferential direction of the ball screw nut.
Figure 9:
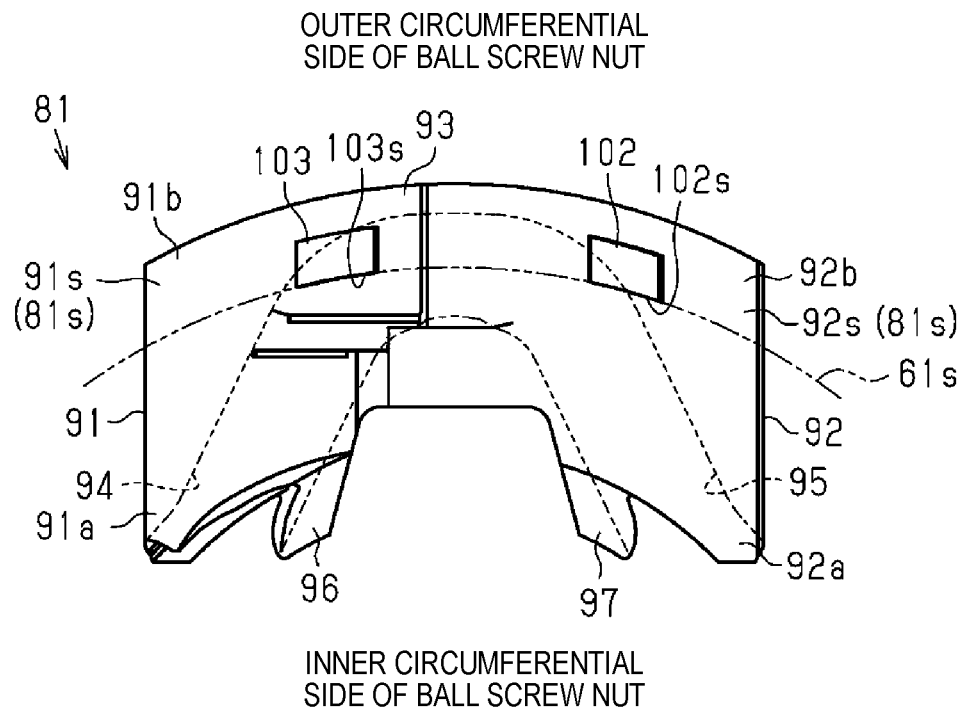
FIG. 9 is a side view of the circulation member as viewed from the axial direction of the ball screw nut.

As shown in FIGS. 6, 7 and 8, the columnar portions 91, 92 are each formed in a columnar shape having an oval cross section corresponding to a cross-sectional shape of each of the through hole portions 83, 84. The columnar portions 91, 92 are respectively provided with deflection holes 94, 95 that open in insertion end portions 91a, 92a located on an inner circumferential side of the ball screw nut 61, and that extend while being smoothly curved from the insertion end portions 91a, 92a toward base end portions 91b, 92b located on an outer circumferential side of the ball screw nut 61 and are connected to the coupling portion 93. Inner diameters of the deflection holes 94, 95 are set to be slightly larger than a diameter of the ball 62. As shown in FIGS. 7, 8 and 9, tongue portions 96, 97 that scoop the balls 62 rolling in the ball raceway R1 into the deflection holes 94, 95 are respectively formed in the insertion end portions 91a, 92a so as to protrude into screw grooves 74 of the rack shaft 12.

Figure 10:
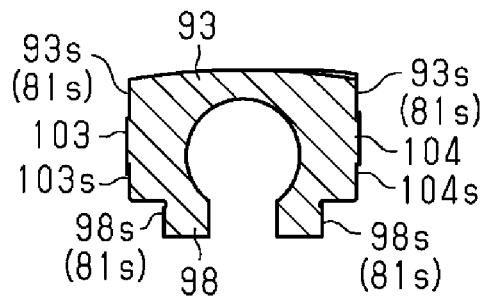
FIG. 10 is a cross-sectional view of a coupling portion of the circulation member, which is orthogonal to an extending direction of a circulation path, and is a cross-sectional view taken along line X-X in FIG. 6.

As shown in FIGS. 6, 7 and 8, the coupling portion 93 is formed between the columnar portions 91, 92 so as to couple the base end portions 91b, 92b. A coupling portion 93 is formed in a substantially rectangular shape that can be inserted into the connection recess portion 85 as viewed in the radial direction of the ball screw nut 61. A narrow portion 98 having a narrow width along the circumferential direction of the ball screw nut 61 is formed on the inner circumferential side of the ball screw nut 61 in the coupling portion 93. The coupling portion 93 is provided with a coupling hole 99 extending in a longitudinal direction of the coupling portion 93. The longitudinal direction of the coupling portion 93 is substantially parallel to the extending direction of the connection recess portion 85, and is inclined with respect to the axial direction of the ball screw nut 61. As shown in FIG. 10, a cross-sectional shape of the coupling hole 99 is formed in a circular shape with part cut out so as to open in the narrow portion 98. The coupling hole 99 linearly extends along the longitudinal direction of the coupling portion 93, and both ends thereof communicate with the deflection holes 94, 95. The circulation path R2 includes the deflection holes 94, 95 and the coupling hole 99.

In the circulation member 81 configured as described above, the columnar portions 91, 92 are respectively inserted into the corresponding through hole portions 83, 84, and the coupling portion 93 is inserted into the connection recess portion 85, thereby being attached to the ball screw nut 61.

Here, a facing surface 81s of the circulation member 81 facing an inner peripheral surface 82s of the attachment hole 82 includes pressing areas formed so as to be in pressure-contact with the inner peripheral surface 82s, and non-pressing areas formed such that the circulation member 81 is gap-fitted into the attachment hole 82.

Specifically, as shown in FIGS. 3 and 4, the inner peripheral surface 82s of the attachment hole 82 includes inner peripheral surfaces 83s, 84s of the through hole portions 83, 84, and side surfaces 85s, 86s of the connection recess portion 85 and the deep groove portion 86. As shown in FIGS. 6 and 7, since the columnar portions 91, 92 are inserted into the through hole portions 83, 84, outer peripheral surfaces 91s, 92s of the columnar portions 91, 92 respectively face the inner peripheral surfaces 83s, 84s of the through hole portions 83, 84. Side surfaces 93s of the coupling portion 93 on both sides in the circumferential direction of the ball screw nut 61 face the side surface 85s of the connection recess portion 85, and side surfaces 98s of the narrow portion 98 on both sides in the circumferential direction of the ball screw nut 61 face the side surface 86s of the deep groove portion 86. That is, the facing surface 81s of the circulation member 81 includes the outer peripheral surfaces 91s, 92s of the columnar portions 91, 92 and the side surfaces 85s, 86s of the connection recess portion 85 and the deep groove portion 86.

As shown in FIGS. 3 and 6, ovals formed by the outer peripheral surfaces 91s, 92s of the columnar portions 91, 92 are respectively formed slightly smaller than an oval formed by the inner peripheral surfaces 83s, 84s of the through hole portions 83, 84, as viewed in the radial direction of the ball screw nut 61. Widths of the coupling portion 93 and the narrow portion 98 are respectively formed slightly smaller than widths of the connection recess portion 85 and the deep groove portion 86. That is, an outline shape of the circulation member 81 is formed slightly smaller than an outline shape of the attachment hole 82 as viewed in the radial direction of the ball screw nut 61.

As shown in FIGS. 5 to 9, protruding portions 101, 102 are respectively formed on the outer peripheral surface 91s of the columnar portion 91 on an axially one end side of the ball screw nut 61 and on the outer peripheral surface 92s of the columnar portion 92 on an axially the other end side of the ball screw nut 61. That is, the protruding portions 101, 102 are formed in the circulation member 81 on both sides in the axial direction of the ball screw nut 61. The protruding portions 101, 102 are each formed in a substantially rectangular plate shape extending in the circumferential direction of the ball screw nut 61. The protruding portions 101, 102 are formed on the outer peripheral surfaces 91s, 92s near the outer circumference of the ball screw nut 61. Protruding amounts of the protruding portions 101, 102 are set such that only the protruding portions 101, 102 are respectively in pressure-contact with the inner peripheral surfaces 83s, 84s when the columnar portions 91, 92 are inserted into the through hole portions 83, 84.

As shown in FIGS. 5 to 10, protruding portions 103, 104 are respectively formed on the side surfaces 93s of the coupling portion 93. That is, the protruding portions 103, 104 are formed in the circulation member 81 on both sides in the circumferential direction of the ball screw nut. Protruding portions 101 to 104 are provided at intervals so as to be discontinuous along an outer periphery of the circulation member 81 as viewed in the radial direction of the ball screw nut 61. The protruding portions 103, 104 are each formed in a substantially rectangular plate shape extending in the longitudinal direction of the coupling portion 93, that is, in a direction inclined with respect to the axial direction of the ball screw nut 61. The protruding portions 103, 104 are respectively formed on the side surfaces 93s near a radial center of the ball screw nut 61. Protruding amounts of the protruding portions 103, 104 are set such that only the protruding portions 103, 104 are respectively in pressure-contact with the side surfaces 85s when the coupling portion 93 is inserted into the connection recess portion 85.

Accordingly, when the circulation member 81 is attached to the attachment hole 82, the protruding portions 101 to 104 is respectively in pressure-contact with the inner peripheral surfaces 83s, 84s and the side surfaces 85s, and a region other than regions where the protruding portions 101 to 104 are formed in the facing surface 81s of the circulation member 81 is in a state of being gap-fitted into the inner peripheral surface 82s of the attachment hole 82. That is, regions where the protruding portions 101 to 104 are formed in the facing surface 81s of the circulation member 81 are the pressing areas, and regions other than the regions where the protruding portions 101 to 104 are formed in the facing surface 81s is the non-pressing areas. The non-pressing areas includes regions of the facing surface 81s on an inner circumferential side and an outer circumferential side of the ball screw nut 61 with respect to the pressing areas, and regions of facing surface 81s on both sides in the circumferential direction of the ball screw nut 61.

As described above, the protruding portions 101 to 104 are formed to be in pressure-contact with the inner peripheral surfaces 83s, 84s and the side surfaces 85s. Therefore, when the circulation member 81 is attached to the attachment hole 82 from the radially outer side, contact surfaces 101s to 104s of the protruding portions 101 to 104 located on the inner circumferential side of the ball screw nut 61 are in contact with a peripheral edge portion of the attachment hole 82 in the outer circumferential surface 61s of the large-diameter cylindrical portion 64 of the ball screw nut 61. In the present embodiment, as shown in FIG. 9, the contact surfaces 101s to 104s of the protruding portions 101 to 104 are each formed in an arc shape matching the outer circumferential surface 61s of the ball screw nut 61 as viewed in the axial direction of the ball screw nut 61. The contact surfaces 101s to 104s are formed so as to have the same distance from a center of the ball screw nut 61. Accordingly, the contact surfaces 101s to 104s are in surface-contact with the peripheral edge portion of the attachment hole 82 in the outer circumferential surface 61s.

Next, operation and effects of the present embodiment will be described.

(1) The facing surface 81s of the circulation member 81 is provided with the pressing areas where the protruding portions 101 to 104 to be in pressure-contact with the inner peripheral surface 82s of the attachment hole 82 are formed, and non-pressing areas formed such that the circulation member 81 is gap-fitted into the attachment hole 82. Therefore, the protruding portions 101 to 104 are in pressure-contact with the inner peripheral surface 82s of the attachment hole 82, so that a position of circulation member 81 in the attachment hole 82 can be prevented from shifting. Accordingly, circular circulation of the balls 62 can be realized. Since the non-pressing area is provided in at least a region of the facing surface 81s on the inner circumferential side of the ball screw nut 61 with respect to the pressing areas, when being attached to the attachment hole 82 from the radially outer side, the circulation member 81 can be inserted into the attachment hole 82 without resistance until the pressing areas, that is, the protruding portions 101 to 104 reach the attachment hole 82. Accordingly, even if the protruding portions 101 to 104 are provided on the facing surface 81s, assemblability of the circulation member 81 into the attachment hole 82 can be prevented from decreasing.

(2) Since the protruding portions 101, 102 are provided in the circulation member 81 on both sides in the axial direction of the ball screw nut 61 and the protruding portions 103, 104 are formed in the circulation member 81 on both sides in the circumferential direction of the ball screw nut 61, the position of the circulation member 81 in the attachment hole 82 can be suitably prevented from shifting in the axial direction and the circumferential direction of the ball screw nut 61.

(3) The contact surfaces 101s to 104s of the protruding portions 101 to 104 located on the inner circumferential side of the ball screw nut 61 are each formed in an arc shape matching the outer circumferential surface 61s of the ball screw nut 61 as viewed in the axial direction of the ball screw nut 61. Therefore, when the circulation member 81 is attached to the attachment hole 82 from the radially outer side, the contact surfaces 101s to 104s are in surface-contact with the circumferential edge portion of the attachment hole 82 in the outer circumferential surface 61s. Accordingly, a posture of the circulation member 81 immediately before the protruding portions 101 to 104 are in pressure-contact with the inner peripheral surface of the attachment hole 82 can be stabilized, thereby improving the assemblability.

(4) Since the protruding portions 101 to 104 are provided at intervals so as to be discontinuous along the outer circumference of the circulation member 81 as viewed in the radial direction of the ball screw nut 61, the assemblability of the circulation member 81 into the attachment hole 82 can be preferably prevented from decreasing, for example, as compared with a case where the protruding portions 101 to 104 are formed in a continuous annular shape along the outer periphery of the circulation member 81. In other words, since the circulation member 81 is press-fitted to the inner peripheral surface 82s of the attachment hole 82 only with the protruding portions 101 to 104 having an area smaller than that of the facing surface 81s, the circulation member 81 is easily assembled into the attachment hole 82 as compared with a case where the entire surface of the facing surface 81s is press-fitted.

This embodiment may be modified and implemented as follows. The present embodiment and the following modifications can be implemented in combination with each other as long as they do not have technical contradiction.

In the above embodiment, the contact surfaces 101s to 104s may have different distances from the center of the ball screw nut 61.

In the above embodiment, at least one of the contact surfaces 101s to 104s may be formed in a plane parallel to a tangent to the outer circumferential surface 61s of the ball screw nut 61, for example, and the shape can be changed as appropriate.

In the above embodiment, the protruding portions 101 to 104 are each formed in a substantially rectangular shape, but may be formed in a substantially triangular shape, for example, and the shape can be changed as appropriate.

In the above embodiment, if the non-pressing area is provided in at least the region of the facing surface 81s on the inner circumferential side of the ball screw nut 61 with respect to the pressing areas, the number and arrangement of the protruding portions formed in the circulation member 81 can be appropriately changed. For example, the protruding portions 101, 102 may be formed in the columnar portions 91, 92 of the circulation member 81, and the protruding portions 103, 104 may not be formed in the coupling portion 93; conversely, the protruding portions 103, 104 may be formed on the coupling portion 93 of the circulation member 81, and the protruding portions 101, 102 may not be formed on the columnar portions 91, 92. For example, the protruding portions may be formed on the outer peripheral surface 91s of the columnar portion 91 on both sides in the axial direction of the ball screw nut 61. Further, only one protruding portion may be formed in the circulation member 81.

Although the flow path of one system is formed by mounting one circulation member 81 to the ball screw nut 61 in the above embodiment, the present invention is not limited thereto, and a plurality of circulation members may be attached to the ball screw nut 61 to form flow paths of a plurality of independent systems. In this case, the circulation member 81 can be configured to include only a single columnar portion without including the coupling portion 93 according to an axial position of the connection points P1, P2 set in the ball screw nut 61.

In the above embodiment, the ball screw device 23 is applied to the EPS 1, but is not limited thereto, and may be applied to, for example, a steering unit of a steer-by-wire type steering device in which power transmission between a steering unit that is steered by a driver and a steering unit that steers the steered wheels 3 in accordance with steering of the driver are separated. In addition, the ball screw device may be used for applications other than the steering device.

Next, technical ideas that can be understood from the above embodiment and modifications will be additionally described below along with their effects.

In the ball screw device, a plurality of the protruding portions are formed on the facing surface at intervals so as to be discontinuous along the outer periphery of the circulation member as viewed in the radial direction of the ball screw nut. According to the above configuration, the assemblability of the circulation member into the attachment hole can be prevented from decreasing, for example, as compared with the case where the protruding portions are formed in a continuous annular shape along the outer periphery of the circulation member as viewed in the radial direction of the ball screw nut. In other words, since the circulation member is press-fitted to the inner peripheral surface of the attachment hole only with the protruding portions having an area smaller than that of the facing surface of the circulation member, the circulation member is easily assembled into the attachment hole as compared with the case where the entire surface of the facing surface is press-fitted.

In addition, the electric power steering device includes the steered shaft provided so as to be able to reciprocate in the axial direction, a rotation member through which the steered shaft is inserted and that is rotated by motor driving, and any ball screw device described above having the steered shaft as the screw shaft.

DESCRIPTION OF REFERENCE NUMERALS AND SIGNS

R1 ball raceway, R2 circulation path, 1 EPS, 12 rack shaft, 21 motor, 22 belt mechanism, 23 ball screw device, 52 driven pulley, 61 ball screw nut, 61s outer circumferential surface, 62 ball, 73, 74 screw groove, 81 circulation member, 81s facing surface, 82 attachment hole, 82s inner peripheral surface, 83, 84 through hole portion, 83s, 84s inner peripheral surface, 85 connection recess portion, 85s side surface, 86 deep groove portion, 86s side surface, 91, 92 columnar portion, 91s, 92s outer peripheral surface, 93 coupling portion, 93s side surface, 98 narrow portion, 98s side surface, 101 to 104 protruding portion, 101s to 104s contact surface.

What is claimed is:

1. A ball screw device comprising:
 a screw shaft having a first screw groove formed on an outer circumference thereof;
 a ball screw nut having a second screw groove formed on an inner circumference thereof; and
 a plurality of balls disposed in a spiral ball raceway wherein the first screw groove and the second screw groove face each other,
 wherein a circulation member is attached to an attachment hole radially penetrating the ball screw nut and a circulation path is formed, the circulation path allowing endless circulation of each of the balls rolling in the ball raceway by short-circuiting between two points of the ball raceway,
 wherein a facing surface of the circulation member that faces an inner peripheral surface of the attachment hole includes a pressing area having a protruding portion pressing the inner peripheral surface, and a non-pressing area at which the circulation member is gap-fitted into the attachment hole, and
 wherein as viewed in an axial direction of the ball screw nut,
  the non-pressing area is located in at least an area of the facing surface on an inner circumferential side of the ball screw nut with respect to the pressing area
  the pressing area includes a contact surface located on the inner circumferential side of the ball screw nut, and
  the contact surface is formed in a curved shape matching an outer circumferential surface of the ball screw nut.

2. The ball screw device according to claim 1, wherein the protruding portion is formed in the circulation member on at least one of both sides in the axial direction and both sides in a circumferential direction of the ball screw nut.

* * * * *